(12) United States Patent
Dimsdale et al.

(10) Patent No.: US 7,945,408 B2
(45) Date of Patent: May 17, 2011

(54) TIME DELAY ESTIMATION

(75) Inventors: Jerry Samuel Dimsdale, Oakland, CA (US); Joseph Newhall West, Petaluma, CA (US); Andrew Philip Lewis, Berkeley, CA (US); Thomas Rahjit Singh Gill, Martinez, CA (US)

(73) Assignee: Voxis, Inc., Paramus, NJ (US)

( * ) Notice: Subject to any disclaimer, the term of this patent is extended or adjusted under 35 U.S.C. 154(b) by 13 days.

(21) Appl. No.: 12/212,167

(22) Filed: Sep. 17, 2008

(65) Prior Publication Data
US 2009/0099813 A1 Apr. 16, 2009

Related U.S. Application Data

(60) Provisional application No. 60/994,639, filed on Sep. 20, 2007.

(51) Int. Cl.
*G01R 25/00* (2006.01)
(52) U.S. Cl. .......................................... 702/79; 702/190
(58) Field of Classification Search .................. 702/79
See application file for complete search history.

(56) References Cited

U.S. PATENT DOCUMENTS

| | | | |
|---|---|---|---|
| 4,836,675 A * | 6/1989 | Hendow et al. | 356/467 |
| 4,856,893 A | 8/1989 | Breen | |
| 5,619,317 A | 4/1997 | Oishi et al. | |
| 5,790,600 A * | 8/1998 | Marchesani et al. | 375/259 |
| 6,665,055 B2 | 12/2003 | Ohishi et al. | |
| 6,917,415 B2 * | 7/2005 | Gogolla et al. | 356/5.06 |
| 2003/0161034 A1 * | 8/2003 | Nikaidou | 359/341.41 |
| 2004/0258420 A1 * | 12/2004 | Sayyah | 398/183 |
| 2005/0052952 A1 | 3/2005 | Panek | |

FOREIGN PATENT DOCUMENTS

| | | |
|---|---|---|
| EP | 0348898 | 1/1990 |
| EP | 0654682 | 5/1995 |
| EP | 1321740 | 6/2003 |
| EP | 1808671 | 7/2007 |
| GB | 1365247 | 8/1974 |
| WO | WO2006/014470 | 2/2006 |

OTHER PUBLICATIONS

PCT International Search Report corresponding to PCT Patent Application PCT/US2008/010846 filed Sep. 18, 2008 (6 pages).
PCT Written Opinion of the International Searching Authority corresponding to PCT Patent Application PCT/US2008/010846 filed Sep. 18, 2008 (9 pages).

* cited by examiner

*Primary Examiner* — Jonathan C Teixeira Moffat
(74) *Attorney, Agent, or Firm* — Wolff & Samson PC (57) ABSTRACT

A time differential is estimated between a plurality of signals by determining a filter response of a first electrical signal with a first filter array, determining a filter response of a second electrical signal with a second filter array, and determining, based at least on the filter response of the first electrical signal and the filter response of the second electrical signal, a time differential between the first electrical signal and the second electrical signal. A first optical signal is converted into the first electrical signal and a second optical signal is converted into the second electrical signal. The filter response of the first electrical signal and the filter response of the second electrical signal are sampled and the time differential between the first electrical signal and the second electrical signal is determined based at least on the sampled filter response of the first electrical signal and the sampled filter response of the second electrical signal.

6 Claims, 6 Drawing Sheets

TIME DELAY ESTIMATION

This application claims the benefit of U.S. Provisional Application No. 60/994,639 filed Sep. 20, 2007 which is incorporated herein by reference.

BACKGROUND OF THE INVENTION

The present invention relates generally to time delay estimation and more particularly to circuits for time delay estimation in laser scanning.

Increasing complex systems require increasingly accurate and fine-grained time delay estimation. For example, some laser scanning systems measure a time delay between a sent and received laser pulse to determine the distance to an object. The time delay between the sending of the pulse and the receiving of the reflected pulse is very small and must be measured with great accuracy—on the order of less than 10 nanoseconds—in order to properly determine the desired distance measurement. Conventional methods of time delay estimation are either prohibitively expensive or unable to accurately detect such small time intervals.

In a laser scanning system, the distance to a remote object is measured by reflecting some energy of a short laser pulse off the object. When the pulse is emitted, some of its energy is diverted immediately and is sent to an avalanche photo diode. The difference in time between the time the pulse is emitted and the time the reflected pulse is received at the emitter, multiplied by the speed of light, provides an estimate of the distance to the remote object. In order for the distance measurement to have accuracy on the order of about a millimeter, the time estimate must be accurate to within a few picoseconds.

Conventional techniques of time delay estimation in laser scanning are described in U.S. Pat. No. 6,665,055, entitled "Light-Wave Rangefinder Using a Pulse Method" (Ohishi), U.S. Pat. No. 5,619,317, entitled "Light-Wave Distance Meter Based on Light Pulses" (Oishi), and U.S. Patent Application No. 2005/0052952, entitled "Time Interval Measurement Device" (Panek).

Ohishi and Oishi disclose techniques for introducing an electrical pulse into a tuned filter. This has the effect of stretching the pulse into a series of damped oscillations. To further reduce the analog measurement bandwidth, this waveform is periodically sampled at a low frequency with a small increase of time delay between each sample. However, as discussed above, these methods fail to provide sufficient accuracy for short time interval estimation and thus cannot provide a quality distance measurement.

Panek utilizes improvements in the speed and cost of high speed samplers to use a slightly different approach. Panek discloses sampling in real time when the bandwidth of the tuned filter is narrower than half the sampling bandwidth. However, only a small part of the pulse energy is used in such an approach. Only a small dynamic range of pulse durations can be measured because, as longer pulses are introduced, the filter response is necessarily diminished. This approach also compromises system accuracy by separately introducing a calibration pulse into each channel.

Related methods of time delay estimation used a Nutt interpolator. However, the Nutt interpolator cannot measure pulse widths wider than the resolution of the filter used and information is lost. Accordingly, such a method cannot properly account for the increased resolution accuracy required in modern time delay estimation.

Accordingly, improved systems and methods of time delay estimation are required.

BRIEF SUMMARY OF THE INVENTION

The present invention generally provides methods of time delay estimation. In one embodiment, estimating a time differential between a plurality of signals includes determining a filter response of a first electrical signal with a first filter array, determining a filter response of a second electrical signal with a second filter array, and determining, based at least on the filter response of the first electrical signal and the filter response of the second electrical signal, a time differential between the first electrical signal and the second electrical signal. In a light detection and ranging (LIDAR) application, for example, a first optical signal is converted into the first electrical signal and a second optical signal is converted into the second electrical signal. The filter response of the first electrical signal and the filter response of the second electrical signal are sampled and the time differential between the first electrical signal and the second electrical signal is determined based at least on the sampled filter response of the first electrical signal and the sampled filter response of the second electrical signal.

In some embodiments, the second electrical signal is amplified and a filter response of the amplified second electrical signal is determined with a third filter array. Either the filter response of the second electrical signal or the filter response of the amplified second electrical signal is then selected as the second electrical signal for determining the time differential.

In another embodiment, a method for calibrating the time delay estimation circuit includes generating a calibration pulse, determining a filter response of the calibration pulse with a first filter array, determining a filter response of the calibration pulse with a second filter array, and determining, based at least on the filter response of the calibration pulse determined with the first filter array and the filter response of the calibration pulse determined with the second filter array, a phase correction. In some embodiments, the filter response of the calibration pulse determined with the first filter array and the filter response of the calibration pulse determined with the second filter array are sampled. The phase correction is determined based at least on the sampled filter response of the calibration pulse determined with the first filter array and the sampled filter response of the calibration pulse determined with the second filter array.

These and other advantages of the invention will be apparent to those of ordinary skill in the art by reference to the following detailed description and the accompanying drawings.

DETAILED DESCRIPTION

At least one embodiment of the present invention provides techniques for measuring the time between two optical pulses (e.g., a start pulse and a stop pulse) that relate to the transit time between a measurement instrument and a distant object. Of course, this may be extended to measure or estimate the time between any two events using the inventive techniques described herein. When applied to laser scanning, optical pulses are converted into an electrical signal to enable an electronic device to make an estimate of the time differential.

Figure 1:
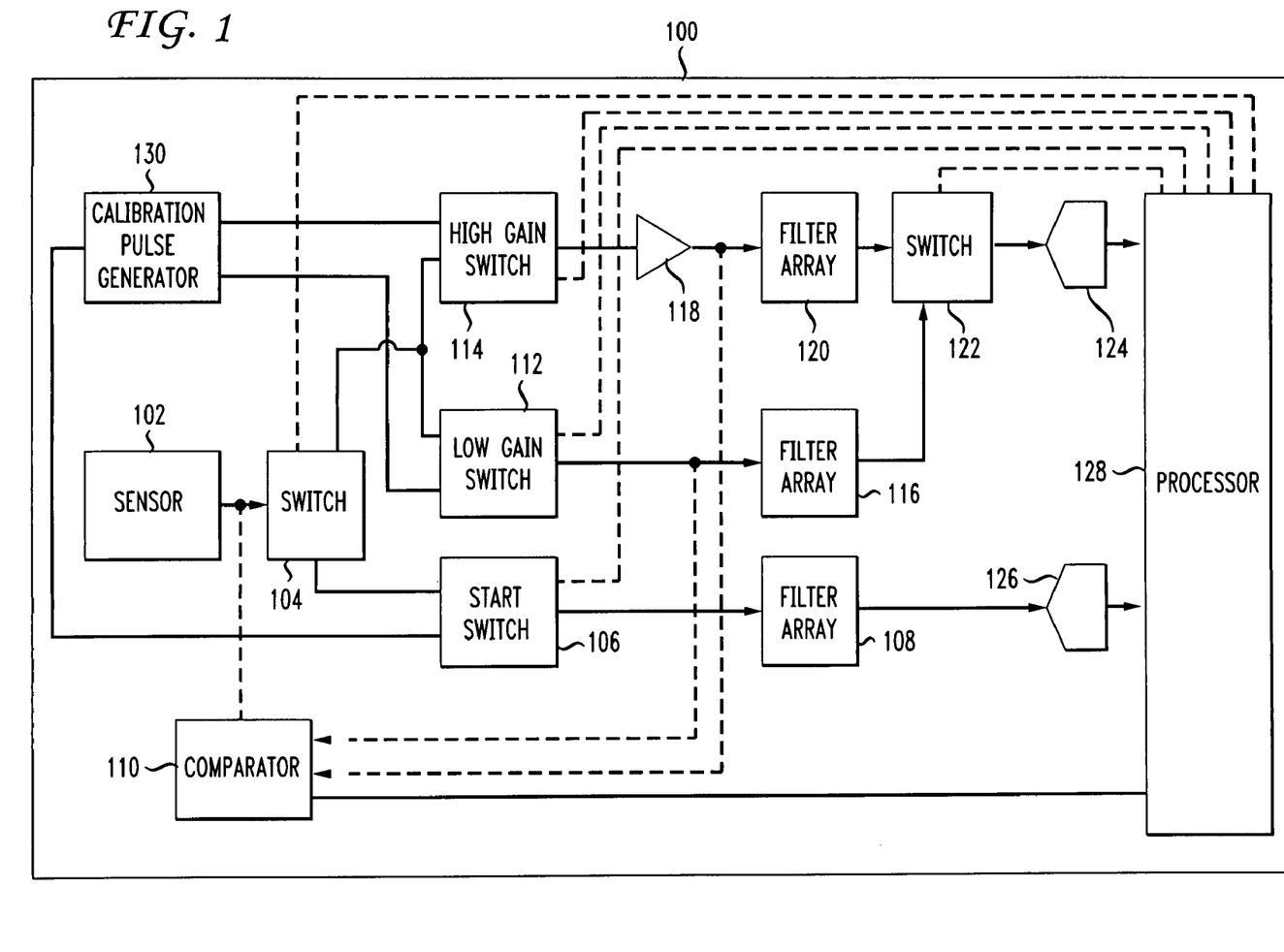
FIG. 1 is a diagram of a time delay estimation circuit according to an embodiment of the invention.

FIG. 1 depicts a time delay estimation circuit 100 according to an embodiment of the present invention. Though described herein as a general circuit with specific reference to components of that circuit, one of skill in the art will recognize that the functions of time delay estimation circuit may be performed by any appropriate combination of electrical and/or electromechanical devices.

Circuit 100 includes sensor 102, which receives one or more inputs. Sensor 102 passes signals indicative of the inputs to switch 104. In some embodiments, switch 104 selectively passes at least a portion of the signals to start pulse switch 106, which allows signals to pass to start pulse filter array 108. In alternative embodiments, switch 104 allows signals to pass directly to start pulse filter array 108. Substantially simultaneously, sensor 102 passes signals to comparator 110.

In some embodiments, switch 104 also selectively passes at least a portion of the signals to low gain switch 112 and high gain switch 114. In turn, low gain switch 112 passes the signals to low gain filter array 116 and high gain switch 114 passes the signals through amplifier 118 to high gain filter array 120. In alternative embodiments, switch 104 allows signals to pass directly to low gain filter array 116 and through amplifier 118 to high gain filter array 120.

Gain selection switch 122 selectively allows signals propagating through low gain filter array 116 and/or high gain filter array 120 to pass to sampler 124 to be sampled before passing to processor 128. Similarly, signals propagating through start filter array 108 pass to sampler 126 to be sampled before passing to processor 128. Processor 128, in addition to receiving signals from samplers 124 and 126 may also be in communication with and/or control switches 104, 106, 112, 114, and 122 as will be discussed further below with respect to FIG. 2.

In some embodiments, circuit 100 also includes a calibration pulse generator 130. Calibration pulse generator 130 is configured to transmit signals (e.g., electrical signals, pulses, etc.) to start switch 106, low gain switch 112, and high gain switch 114.

Sensor 102 may be any appropriate sensor, such as a photodetector. In at least one embodiment, sensor 102 is an avalanche photodiode. In an alternative embodiment, sensor 102 is an amplified avalanche photodiode. In some embodiments, sensor 102 is configured to convert an incoming input signal (e.g., an optical pulse, a pulse pair, etc.) into an electrical signal. Sensor 102 may receive a pulse pair (e.g., a start pulse and a stop pulse) and convert the optical signals into electrical signals.

Switches 104, 106, 112, 114, and 122 may be any appropriate switch capable of receiving and/or selectively passing signals (e.g., electrical signals indicative of optical pulses). In some embodiments, switches 104, 106, 112, 114, and 122 may be analog or bilateral switches. In at least one embodiment, switch 104 is an RF analog switch. Switches 106, 112, and 114 may be capable of switching between incoming signals from sensor 102 via switch 104 and calibration pulse generator 130. Switch 122 may directed by processor 128 to utilize the signal from either filter array 116 or filter array 120 that is most likely to be in an appropriate range of amplitude.

Filter arrays 108, 116, and 120 may be any appropriate combinations (e.g., banks, stacks, etc.) of filters (e.g., electronic filters, electromechanical filters, etc.) such as surface acoustic wave (SAW) filters, comb filters, band pass filters, or the like. In at least one embodiment, filter arrays 108, 116, 120 are SAW filters centered at approximately 140 MHz and approximately 80 MHz and have a band width of approximately 8 MHz. That is, each filter array 108, 116, 120 may have multiple filters (e.g., one filter centered at approximately 140 MHz and one filter centered at approximately 80 MHz) and signals may be further split to pass through all the filters in parallel in the filter arrays. The output of the filters is recombined before passing further through time delay estimation circuit 100. Other types of filters, centers, and band widths may be used as appropriate.

Comparator 110 may be any appropriate device or devices, such as an analog comparator, for comparing multiple signals. Comparator 110 may be configured to detect a start pulse (e.g., from sensor 102), a stop pulse (e.g., from low gain switch 112), and an amplified stop pulse (e.g., from amplifier 118) and send signals indicative of these pulses to processor 128. Comparator 110 may thus use counters operating at a predetermined frequency. In at least one embodiment, the counters are running at 250 MHz.

Samplers 124 and 126 may be any appropriate sampling devices. In at least one embodiment, samplers 124 and 126 are and/or include high speed analog to digital converters. Samplers 124 and 126 may thus be configured to determine rising and falling edges of the start pulse, the stop pulse, and the amplified stop pulse as well as any calibration pulses.

Processor 128 may be any appropriate computer, processor, or combination of components configured to, among other things, collect data associated with time measurement and/or estimation, estimate differential time measurements, communicate with other processors (not shown), and control the states of switches 104, 106, 112, 114, and 122.

Processor 128 may control the overall operation of circuit 100 by executing computer program instructions which define such operation. The computer program instructions may be stored in a storage device (not shown) (e.g., magnetic disk, database, etc.) and loaded into memory (not shown) when execution of the computer program instructions is desired. Thus, applications for performing the herein-described method steps in methods 200 and 300 are defined by the computer program instructions stored in the memory and/or storage and controlled by the processor 128 executing the computer program instructions. The processor 128 may also include one or more network interfaces (not shown) for communicating with other devices via a network. Processor 128 may include one or more central processing units, read only memory (ROM) devices and/or random access memory (RAM) devices. One skilled in the art will recognize that an implementation of an actual controller could contain other components as well, and that the processor of FIG. 1 is a high level representation of some of the components of such a controller for illustrative purposes.

According to some embodiments of the present invention, instructions of a program (e.g., controller software) may be read into memory, such as from a ROM device to a RAM device or from a LAN adapter to a RAM device. Execution of sequences of the instructions in the program may cause the processor 128 to perform one or more of the method steps described herein, such as those described above with respect to methods 200 and 300. In alternative embodiments, hardwired circuitry or integrated circuits may be used in place of, or in combination with, software instructions for implementation of the processes of the present invention. Thus, embodiments of the present invention are not limited to any specific combination of hardware, firmware, and/or software. The memory may store the software for the processor 128, which may be adapted to execute the software program and thereby operate in accordance with the present invention and particularly in accordance with the methods described in detail above. However, it would be understood by one of ordinary skill in the art that the invention as described herein could be implemented in many different ways using a wide range of programming techniques as well as general purpose hardware sub-systems or dedicated controllers.

Such programs may be stored in a compressed, uncompiled and/or encrypted format. The programs furthermore may include program elements that may be generally useful, such as an operating system, a database management system, and device drivers for allowing the controller to interface with computer peripheral devices, and other equipment/components. Appropriate general purpose program elements are known to those skilled in the art, and need not be described in detail herein.

Calibration pulse generator 130 may be any appropriate component or group of components able to transmit substantially simultaneous signals to start pulse switch 106, low gain switch 112, and high gain switch 114. Further discussion of calibration in relation to calibration pulse generator is included below with respect to FIG. 6.

Figure 2:
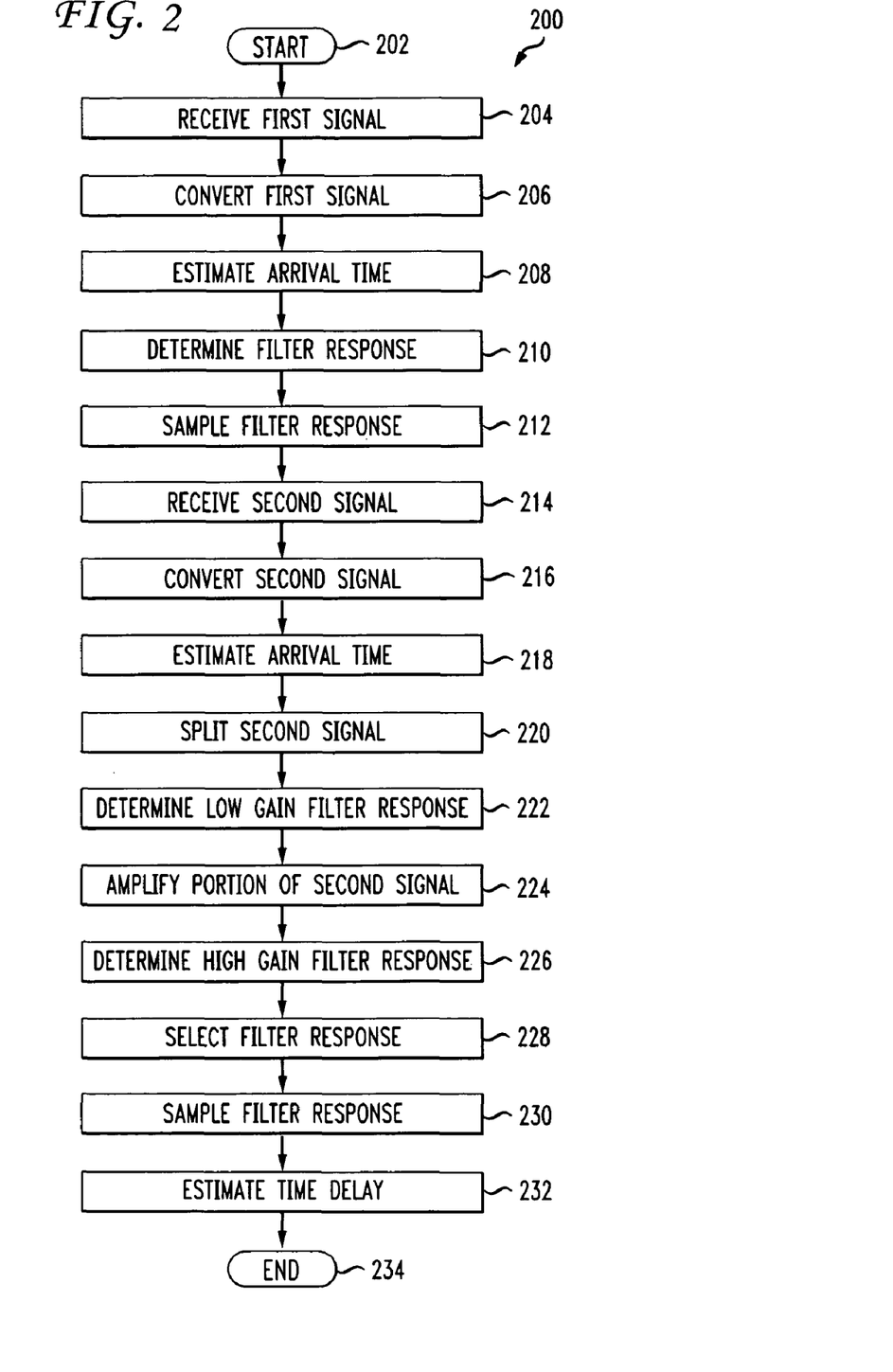
FIG. 2 depicts a flowchart of a method of time delay estimation according to an embodiment of the present invention.

FIG. 2 depicts a flowchart of a method 200 of time delay estimation according to an embodiment of the present invention. Time delay estimation circuit 100 or a similar time delay estimator may be used to perform the various steps of method 200. The method starts at step 202.

In step 204, a first signal is received at sensor 102. The signal may be an optical signal, such as a start pulse or signal from a laser scanning apparatus. In step 206, the first signal is converted into an electrical signal.

In step 208, a course estimate is made of the time of arrival of the first signal. The course estimate may be made by comparator 110 in conjunction with counters in processor 128. In some embodiments, such an estimate may be accurate to within a few nanoseconds.

In step 210, a filter response of the first signal is determined. The filter response may be determined by the start filter array 108. As discussed above, in some embodiments, two sets of filters are used in filter array 108. For example, one set of filters may be 80 MHz and on set of filters may be 140 MHz. The first signal is split and half of the signal enters one set of filters (e.g., the 80 MHz filters) and the other half of the signal enters the other set of filters (e.g., the 140 MHz filters). The output (e.g., filter response) is recombined before passing to step 212.

Figure 3:
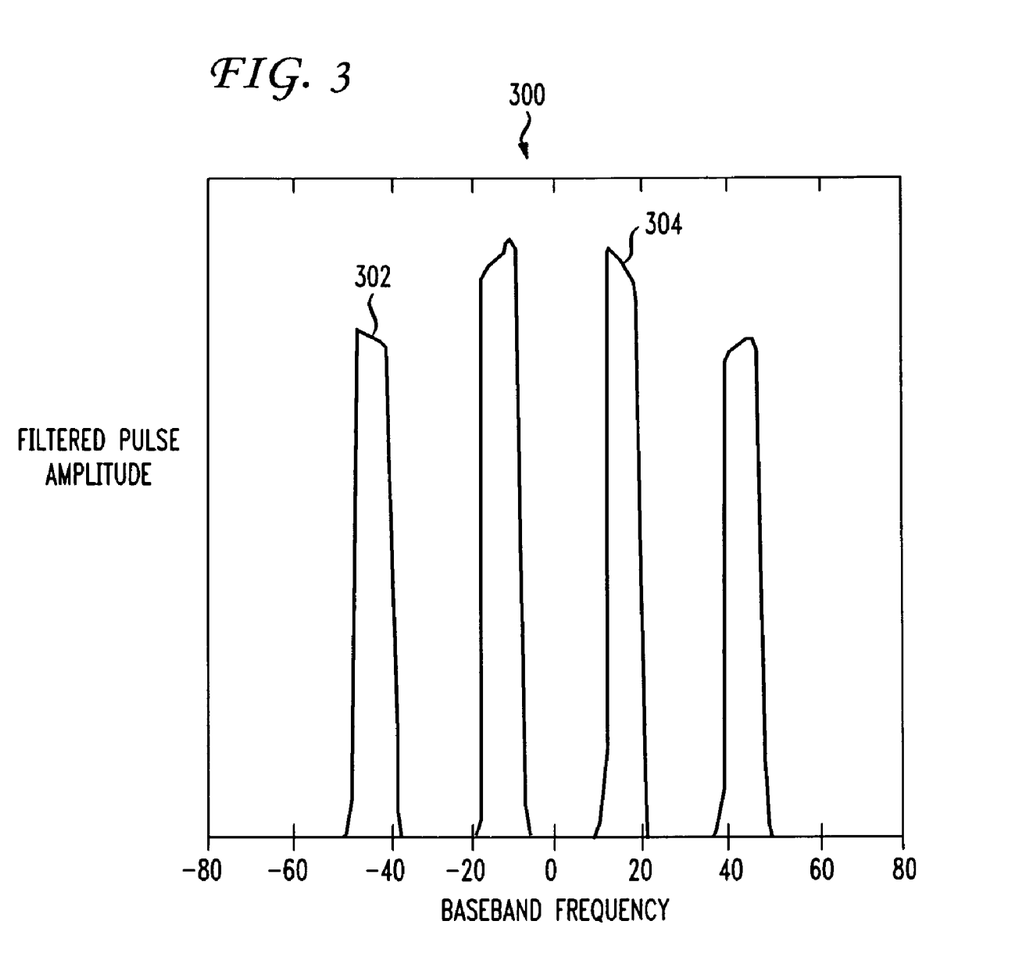
FIG. 3 depicts a graph of exemplary filter frequencies aliased to the base band.

In practice, the pass bands should not overlap when aliased down to the base band. In the exemplary embodiment described herein, with sampling at 125 MHz, the 140 MHz frequencies are aliased to 15 MHz and the 80 MHz frequencies are aliased to 45 MHz. FIG. 3 depicts a graph 300 of exemplary filter frequencies aliased to the base band with a 125 MHz sampling rate resulting in a pulse amplitude 302 from one filter (e.g., the 80 MHz filter) and a pulse amplitude 304 from the other filter (e.g., the 140 MHz filter).

FIG. 3 shows "aliased" filter responses. The center of the X axis of the graph is at zero frequency. There are positive and negative frequencies shown in the graph. The response designated as pulse amplitude 304 is the positive frequency alias of the 140 MHz filter response. The corresponding 140 MHz negative frequency alias is the mirror-image response immediately to the left of pulse amplitude 304. The response designated as pulse amplitude 302 is the negative-frequency alias of the 80 MHz response. The corresponding 80 MHz positive-frequency alias is the response to the right of the alias designated as pulse amplitude 304. Note that sampling is equivalent to radio frequency "mixing" (e.g., a multiplication process), just viewed from a different perspective. So, one of ordinary skill in the art would recognize not only the positive-frequency aliases but also the negative frequency aliases, as well as the frequency-order inversion that happens for the aliased responses from the 140 MHz filter (since the sample frequency is less than the filter frequency).

Figure 4:
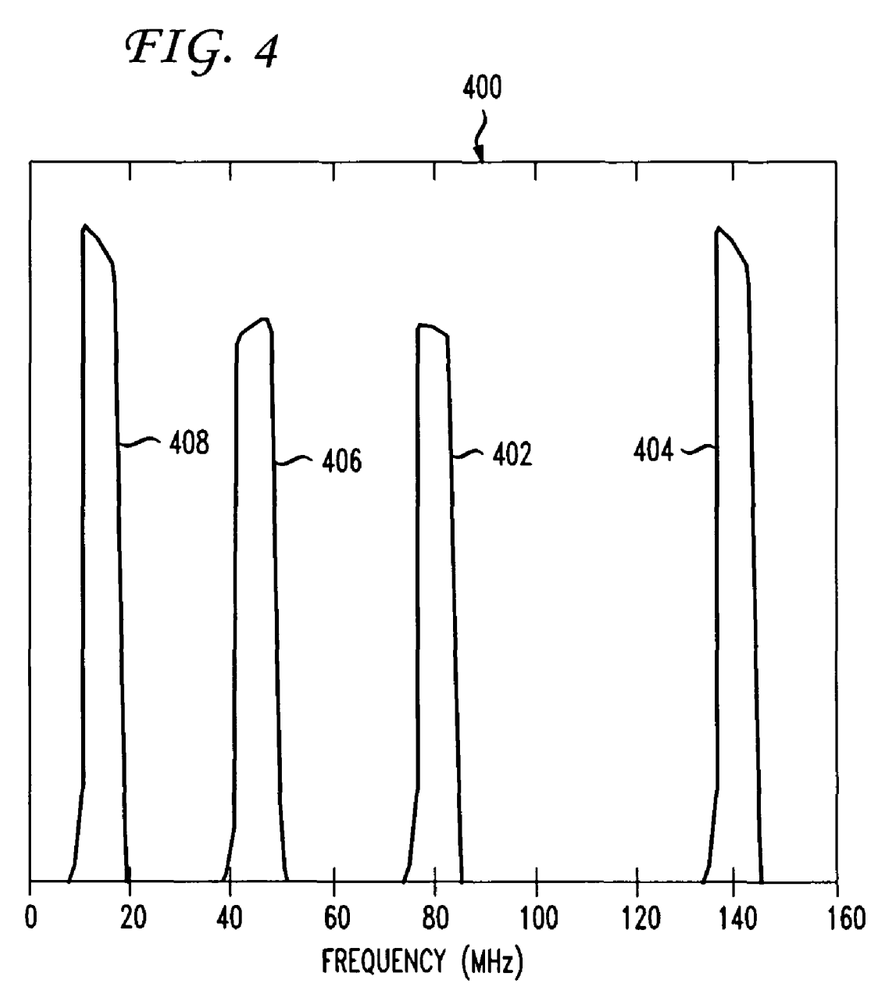
FIG. 4 depicts a graph of exemplary filter responses.

FIG. 4 depicts a graph 400 of exemplary filter responses with a 125 MHz sampling rate. Unaliased filter responses 402 and 404 are centered around the respective filter frequencies of 80 MHz and 140 MHz, as discussed above. The 80 MHz and 140 MHz frequencies are aliased down to responses 406 (e.g., at 45 MHz) and 408 (e.g., at 15 MHz), respectively.

Figure 5:
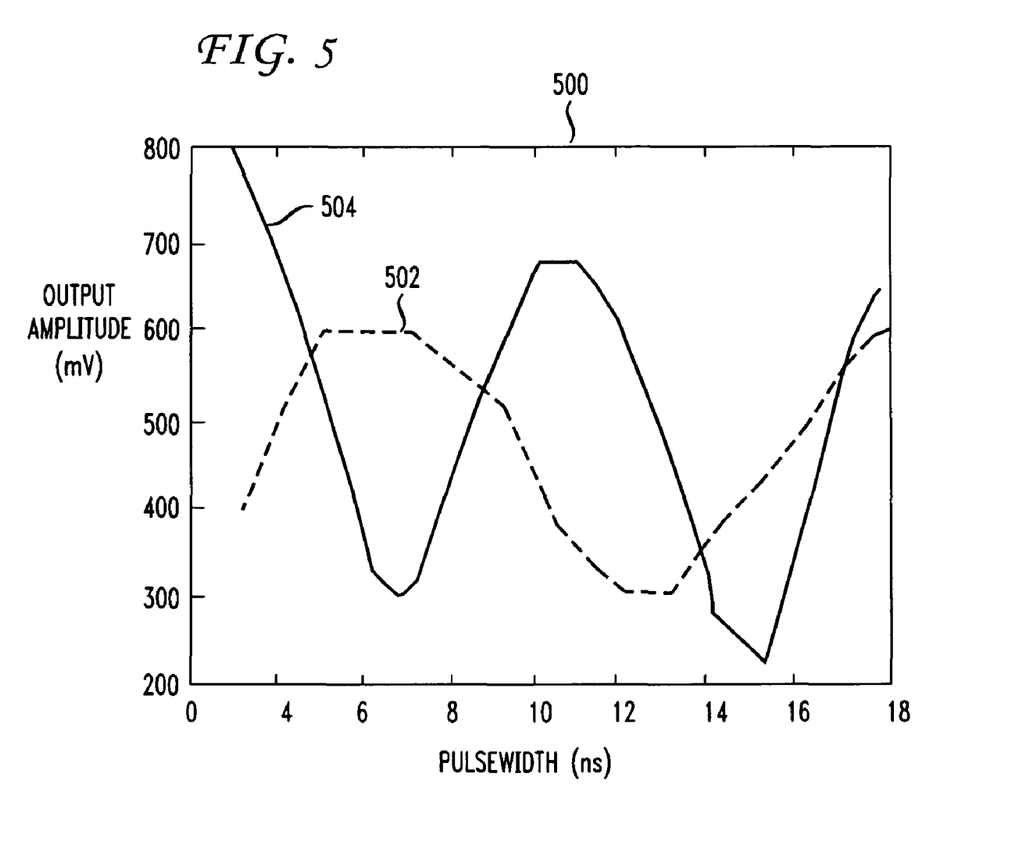
FIG. 5 depicts a graph on an exemplary filter response as a function of pulse width.

Use of multiple filters allows a broader range of pulse widths to be properly addressed. The spectrum of a clipped Gaussian pulse has $\sin(x)/x$ envelope response nulls; the frequency location of the null will vary as a function of pulse width. When the pulse width is close to the reciprocal of the center frequency, the responses from the rising and falling edges approximately cancel each other out and there is very little signal. In the exemplary embodiment discussed herein, the 140 MHz filters have the largest response to a pulse approximately three to four nanoseconds wide and the smallest response to a pulse approximately seven seconds wide. The 80 MHz filters have the largest response to a pulse approximately seven nanoseconds wide and the smallest response to a pulse approximately twelve to thirteen seconds wide. Using both filters ensures there will be a significant response for pulses up to thirteen nanoseconds wide. Additionally, more of the energy of the original pulse may be used. For pulse widths in which both filters provide a good response, twice as many frequencies are used in the time delay estimation, which improves the accuracy of the measurement. FIG. 5 depicts a graph 500 on an exemplary filter response as a function of pulse width. Pulse 502 represents the signal through a first filter (e.g., the 80 MHz filter) and pulse 504 represents the signal through a second filter (e.g., the 140 MHz filter).

After the filter response is determined as described above in step 210, the filter response is sampled by sampler 126 in step 212. That is, sampler 126 samples the filter response determined in step 210. In at least one embodiment, the filter response is sampled at a high rate (e.g., approximately 125 MHz). Of course, other sampling rates may be utilized.

It is necessary that the sample-and-hold part of an analog-to-digital converter (ADC) have enough bandwidth to allow the original frequency content to pass correctly into the rest of the ADC. So, for example, if the 125 MHz ADC has a sample-and-hold input bandwidth of 60 MHz, none of the energy from the SAW filters (e.g., filter arrays 108, 116, 120) will be available for the ADC to process.

In step 214, a second signal is received at sensor 102. The second signal may be an optical signal, such as a stop or return pulse or signal at a laser scanning apparatus. In step 216, the second signal is converted into an electrical signal.

In step 218, a course estimate is made of the time of arrival of the second signal. The course estimate may be made by comparator 110 in conjunction with counters in processor 128. In some embodiments, such an estimate may be accurate to within a few nanoseconds.

In step 220, the second signal is split into two channels. That is, the second signal is split, sampled, copied, or otherwise augmented to provide a signal to both high gain switch 114 and low gain switch 112. In this way, one portion of the signal (e.g., one channel) is provided along an amplified path (e.g., through high gain switch 114, amplifier 118 and high gain filter array 120) and another portion of the signal (e.g., another channel is provided along an unamplified path (e.g., through low gain switch 112 and low gain filter array 116). The use of two channels in this manner allows accurate measurement of a much wider dynamic range of second signals (e.g., stop/return pulses, etc.). The propagation of the second signal portions through the filter arrays 116 and 120 takes a relatively long amount of time, so the processor 128 may direct switch 122 to only pass the signal from the filter array processing a signal likely to be in an appropriate amplitude range.

In step 222, a filter response of the low gain portion of the second signal is determined. That is, a filter response is determined for the portion of the signal passing through the low gain filter array 116 after being split in step 220. The filter response may be determined by the low gain filter array 116. As discussed above, in some embodiments, two sets of filters are used in filter array 116. For example, one set of filters may be 80 MHz and on set of filters may be 140 MHz. The portion of the second signal is split and half of the signal enters one set of filters (e.g., the 80 MHz filters) and the other half of the signal enters the other set of filters (e.g., the 140 MHz filters). The output (e.g., filter response) is recombined before passing to step 228.

In step 224, the high gain portion of the second signal is amplified by amplifier 118. That is, the channel passing through the amplified path is amplified by amplifier 118 before passing to step 226 to be filtered.

In step 226, a filter response of the amplified portion of the second signal is determined. The filter response may be determined by the high gain filter array 120. As discussed above, in some embodiments, two sets of filters are used in filter array 120. For example, one set of filters may be 80 MHz and on set of filters may be 140 MHz. The portion of the second signal is split and half of the signal enters one set of filters (e.g., the 80 MHz filters) and the other half of the signal enters the other set of filters (e.g., the 140 MHz filters). The output (e.g., filter response) is recombined before passing to step 228.

In at least one embodiment method step 222 is performed in parallel with method steps 224 and 226. That is, a portion of the second signal passes through the unamplified path and is filtered by filter array 116 at substantially the same time as another portion of the second signal passes through the amplified path and is amplified by amplifier 118 and is filtered by filter array 120.

In step 228, a filter response is selected. In at least one embodiment, processor 128 directs switch 122 to allow a filter response from either the amplified path or the unamplified path to pass to sampler 124. As discussed above, processor 128 may direct switch 122 to only pass the signal from the filter array processing a signal likely to be in an appropriate amplitude range.

The appropriate filter response is passed to sampler 124 and the filter response is sampled in step 230. That is, sampler 124 samples the filter response selected in step 228. In at least one embodiment, the filter response is sampled at a high rate (e.g., approximately 125 MHz). Of course, other sampling rates may be utilized.

In step 232, a time delay is estimated. That is, a time differential between the first electrical signal and the second electrical signal is determined based at least on the filter response of the first electrical signal and the filter response of the second electrical signal.

Figure 6:
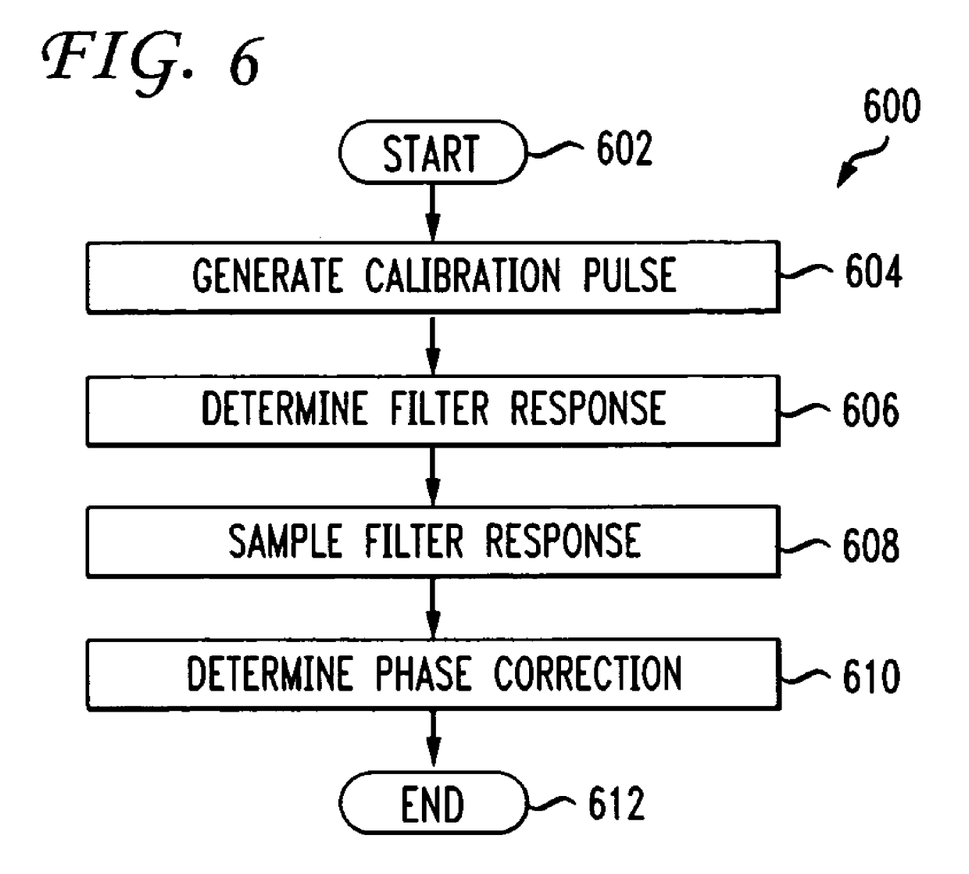
FIG. 6 shows a flowchart of a method of calibration of a time delay estimation circuit according to an embodiment of the present invention.

To estimate the time delay between two signals (e.g., the first and second electrical signals, two optical signals, etc.), Fourier transforms $F_s$ and $G_s$ of the sampled filter responses determined in steps 212 and 230, respectively, are found. At each frequency s in a pass band, magnitude $M_s=|F_s||G_s|$ and the phase difference $P_s=(\arg(F_s/G_s)+K_s)/2\pi$, which may be predetermined and/or adjusted by a value given by a calibration pulse, discussed below with respect to FIG. 6, are computed.

For the Fourier transforms described above, let F(s) be a Fourier transform of a given signal f(t). Using the time shifting property of Fourier transforms, the transform of $f(t-t_0)$ is $F(s)e^{2\pi i t_0 s}$. In other words, the transform of f is shifted by a phase and the phase shift at frequency s is $t_0 s$. Given two signals f(t) and g(t) that are expected to differ by a time shift, the best estimate for the shift is the value $t_0$ that maximizes $\int_{-\infty}^{\infty} f(t-t_0)g(t)dt = \int_{-\infty}^{\infty} f(t-t_0)\overline{g}(t)dt = \int_{-\infty}^{\infty} F(s)\overline{G}(s)e^{2\pi i t_0 s}ds$.
This utilizes Parseval's relation and the fact that g is real valued.

In the case of a discrete Fourier transform of a band-limited signal sampled at frequency $w_0$, an analogous relation of $$\sum_k f(t_k)g(t_{k+d}) = \sum_s F(s)\overline{G}(s)e^{2\pi i d s/w_0}$$

exists.

$$\sum_k f(t_k)g(t_{k+d})$$

is the sample correlation defined only when d is an integer, but $$\sum_s F(s)\overline{G}(s)e^{2\pi i d s/w_0}$$

is a continuous function defined for all real values of d. When d is not integral, this may be interpreted as the sample correlation that would be obtained by reconstructing the band-limited continuous signal from its constituent frequencies, shifting by d units in the time domain, resampling at the integer points, and computing the sample correlation.

This expression is maximized for a fixed frequency s when $st_0$ is equal to the measured phase difference between F(s) and G(s). To find the global optimum, $F(s)=|F(S)|e^{2\pi\theta_0(s)}$ and $G(s)=|G(s)|e^{2\pi\theta_1(s)}$ may be expressed in terms of their magnitudes and phases as $$\sum_s F(s)\overline{G}(s)e^{2\pi i t_0 s} = \sum_s |F(s)||G(s)|e^{2\pi(\theta_0(s)-\theta_1(s)+t_0 s)}.$$

Thus, the real part is $\Sigma|F(s)||G(s)|\cos(2\pi(\theta_0(s)-\theta_1(s)+t_0 s))$. To the lowest order term, maximizing this quantity is the same as minimizing $$\sum_s |F(s)||G(s)|(\theta_0(s) - \theta_1(s) - t_0 s)^2.$$

This may be achieved when $$t_0 = \frac{\sum_s |F(s)||G(s)|(\theta_0(s) - \theta_1(s))s}{\sum_s |F(s)||G(s)|s^2}.$$

At a single frequency s, signals that are off by a full period cannot be distinguished so $P_s$ is defined only with respect to the integers. Referring to the completed sampled filtered signal is insufficient to resolve this ambiguity. The signal looks like a modulated sinusoid at the center frequency of the filter.

Because it is coarsely sampled, in the presence of noise it is difficult to distinguish between a signal and the same or a similar signal that is shifted by any number of periods. Accordingly, the phase must be unwound. That is, the proper phase must be resolved by some means. In some embodiments, the phase is unwound by using coarse counters described above. In alternative embodiments, the phase is unwound by combining information from different frequencies.

In embodiments in which the phase is unwound with counters, at each pulse the counters are triggered when the pulse rises above a certain threshold. The counters are again triggered when the pulse falls below the threshold. Averaging these two counter values provides an estimate of the location of the pulse center. In some embodiments, this estimate may be accurate to less than the frequency period of the counters, e.g. four nanoseconds for a 250 MHz clock.

Let $s_c$ be a particular frequency near the center of the pass band in MHz. For each pulse, let $F_{s_c}$ be the value of the fast Fourier transform as $s_c$. Let $C_p$ be the counter value estimate of the pulse center and $C_f$ be the counter value corresponding to the start of the data used in the FFT. Let $\Phi_{s_c}$ be the fraction part of $\arg(F_{s_c})/2\pi + (C_f - C_p) \cdot s_c / \text{counterfrequency}$. $\Phi_{s_c}$ provides an estimate of the phase of the filtered pulse at $s_c$ measured relative to $C_p$, the counter value when the pulse arrived. By comparing the value of $\Phi_{s_c}$ for a particular pulse to the average value of $\Phi_{s_c}$ over many pulses, $\Phi_{s_c}^{av}$, the arrival of the pulse in the counter cycle may be estimated. The average $\Phi_{s_c}^{av}$ does not have significant drift with time or temperature and may thus be known in advance. In situations in which the average is not known, it may be computed dynamically by generating a number (e.g., approximately a few hundred) of pulses and keeping a basic histogram of the phases $\Phi_{s_c}$ in the circle. In this way, an estimate of the arrival of the pulse in the clock cycle may be obtained. To be precise, the raw counter values may be adjusted by $(\Phi_{s_c} - \Phi_{s_c}^{av})/s_c$. A course estimate of the time delay may be achieved by making such an estimate for each pulse. The phase $P_s$ may then be adjusted at each frequency by an integer $N_s$ to obtain a phase estimate of $\Phi_s = P_s + N_s$, which corresponds to the coarse estimate.

In embodiments in which counters are not available, the phase may be unwound by estimating a slope. For each frequency s in the pass band, a phase estimate $P_s$ gives a time delay estimate of $t_s = P_s/s$. Adjusting $P_s$ by an integer N gives a new estimate $t_s' = (P_s + N)/s$. To choose the optimal value of N, the parameters $\tau$ and n that give the optimal least squares estimate for the set of equations $\tau s = P_s + n$ for each s in the pass band is found. Then, N is set to the closest integer to n and this is used to compute all of the absolute phases $\Phi_s = P_s + N_s$ before making the final time delay estimate.

Once each phase $P_s$ has been adjusted by an integer using one of the herein described methods or another appropriate method to determine the absolute phase difference $\Phi_s$, the values from the different frequencies are average to find the optimal time delay estimate $$T = \frac{\sum_s M_s \Phi_s s}{\sum_s M_s s^2}.$$

The method ends at step 234.

FIG. 6 shows a flowchart of a method 600 of calibration of a time delay estimation circuit according to an embodiment of the present invention. Method 600 may be performed by various components of time delay estimation circuit 100, described above with respect to FIG. 1. Generally, a calibration pulse may be used to account for differences between filter arrays (e.g., filter arrays 108, 116, 120). The phase response of filters such as SAW filters is sensitive to temperature. Without calibration, phase responses would present as error in a time delay estimate due to temperature drift, manufacturing discrepancies, and/or other factors. The method starts at step 602.

In step 604, a pulse is generated by calibration pulse generator 130. The calibration pulse is a single pulse that is split and sent to filter arrays 108, 116, and 120 via start switch 106, low gain switch 112, and high gain switch 114, respectively.

In step 606, a filter response for each filter array is determined. This may be similar to the filter responses determined above in steps 210, 222, and 226 of method 200.

In step 608, the filter responses for each filter array 108, 116, 120 are sampled. This may be similar to the sampling described above with respect to method steps 212 and 230 of method 200.

In step 610, a phase correction for each frequency in the pass band is determined. In this way, a stable zero-time reference is determined. In at least one embodiment, a fast Fourier transform (FFT) is applied to each sampled pulse from step 608. This provides a collection of complex numbers representing the phase and amplitude at each frequency. For each frequency s in the pass band, complex numbers $F_s$ and $G_s$ are given by the FFT for the start channel (e.g., for the calibration pulse traveling through filter array 108) and for the return channel (e.g., for the calibration pulse traveling through filter arrays 116 and 120), respectively, at each frequency. The correction factor $K_s$ to be applied at frequency s is given by the phase difference as $K_s = \arg(G_s/F_s)$. In this way, the phase correction is determined. The phase correction may be used as described above with respect to unwinding the phase for time delay estimation in step 232 of method 200.

The method ends at step 612.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of estimating a time differential between a plurality of signals comprising:
   determining a filter response of a first electrical signal with a first filter array comprising a first plurality of bandpass filters;
   determining a filter response of a second electrical signal with a second filter array comprising a second plurality of bandpass filters;
   amplifying the second electrical signal;
   determining a filter response of the amplified second electrical signal with a third filter array;
   selecting either the filter response of the second electrical signal or the filter response of the amplified second electrical signal for determining a time differential; and determining, based at least on the filter response of the first electrical signal and the selected filter response, a time differential between the first electrical signal and the second electrical signal.

2. The method of claim 1 further comprising:
converting a first optical signal into the first electrical signal; and
converting a second optical signal into the second electrical signal.

3. The method of claim 1 further comprising:
sampling the filter response of the first electrical signal;
sampling the selected filter response; and
wherein the time differential between the first electrical signal and the second electrical signal is determined based at least on the sampled filter response of the first electrical signal and the sampled selected filter response.

4. An apparatus for estimating a time differential between a plurality of signals comprising:
a first filter array comprising a first plurality of bandpass filters adapted to determine a filter response of a first electrical signal;
a second filter array comprising a second plurality of bandpass filters adapted to determine a filter response of a second electrical signal;
an amplifier adapted to amplify the second electrical signal;
a third filter array adapted to determine a filter response of the amplified second electrical signal;
a switch adapted to select either the filter response of the second electrical signal or the filter response of the amplified second electrical signal for determining a time differential; and
a processor adapted to determine, based at least on the filter response of the first electrical signal and the selected filter response, a time differential between the first electrical signal and the second electrical signal.

5. The apparatus of claim 4 further comprising:
a sensor adapted to convert a first optical signal into the first electrical signal; and to convert a second optical signal into the second electrical signal.

6. The apparatus of claim 4 further comprising:
a first sampler adapted to sample the filter response of the first electrical signal;
a second sampler adapted to sample the selected filter response; and
wherein the processor is further adapted to determine the time differential between the first electrical signal and the second electrical signal based at least on the sampled filter response of the first electrical signal and the sampled selected filter response.

* * * * *